COMMUNICATION SYSTEM UTILIZING MAGNETIC RECORDERS

Original Filed July 10, 1948 7 Sheets-Sheet 1

INVENTOR.
George H. Lee

COMMUNICATION SYSTEM UTILIZING MAGNETIC RECORDERS

Original Filed July 10, 1948 7 Sheets-Sheet 2

INVENTOR.
George H. Lee

COMMUNICATION SYSTEM UTILIZING MAGNETIC RECORDERS

Original Filed July 10, 1948 7 Sheets-Sheet 3

INVENTOR.
George H. Lee

COMMUNICATION SYSTEM UTILIZING MAGNETIC RECORDERS

Original Filed July 10, 1948 7 Sheets-Sheet 4

INVENTOR.
George H. Lee

COMMUNICATION SYSTEM UTILIZING MAGNETIC RECORDERS

Original Filed July 10, 1948 7 Sheets-Sheet 5

INVENTOR.
George H. Lee

COMMUNICATION SYSTEM UTILIZING MAGNETIC RECORDERS
Original Filed July 10, 1948 7 Sheets-Sheet 6
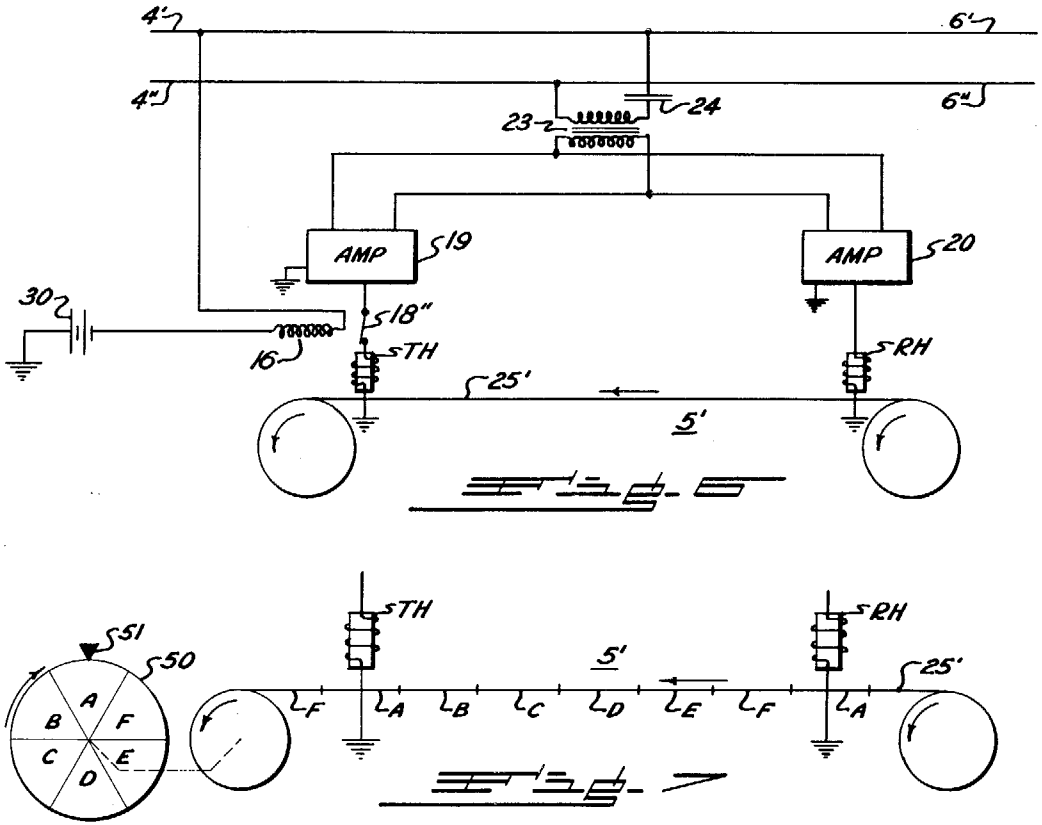
INVENTOR.
George H. Lee

COMMUNICATION SYSTEM UTILIZING MAGNETIC RECORDERS

Original Filed July 10, 1948 7 Sheets-Sheet 7

INVENTOR.
George H. Lee

United States Patent Office

Re. 24,170

Reissued June 26, 1956

24,170

COMMUNICATION SYSTEM UTILIZING MAGNETIC RECORDERS

George H. Lee, Oak Ridge, Tenn.

Original No. 2,669,605, dated February 16, 1954, Serial No. 38,104, July 10, 1948. Application for reissue July 13, 1955, Serial No. 521,941

40 Claims. (Cl. 179—6)

Matter enclosed in heavy brackets [ ] appears in the original patent but forms no part of this reissue specification; matter printed in italics indicates the additions made by reissue.

This invention relates generally to telephonic communication systems and, more particularly, to telephonic communication systems utilizing repeating type magnetic recorders as a component thereof.

Although the principles of operation and many of the detailed mechanisms of the present invention have application to other fields, the present invention finds particular utility as a system for transmitting "quotations," that is, the current bid and asked prices of securities, from the trading floor of a securities exchange to brokerage houses located some distance from the exchange. The invention, therefore, will be described with particular reference to such a quotation system. This quotation information is to be distinguished from the information as to the latest selling price of securities, which latter information is transmitted by the ticker tape.

As a basis of comparison, and in order to clarify the problem involved, it will be helpful to outline a typical quotation system presently in use at a typical securities exchange. The approximately one thousand securities for which current quotations must be supplied are broken down into twenty groups or codes, each having a code number and each consisting of perhaps fifty securities. On the floor of the exchange there are perhaps one hundred quotation pages, each of whom are responsible for perhaps ten securities. Each quotation page is in telephonic communication with a teleregister operator of whom there are perhaps twenty, each teleregister operator having jurisdiction over one code of fifty securities. Each teleregister operator has remote control over one section or code of a large teleregister or annunciator board upon which the quotations of the various securities are visibly displayed. The teleregister operator's control over the quotations appearing on the teleregister board is by way of a manually operated key set, which key set, along with the teleregister board, comprises simply an electromagnetic relay type of annunciator system. Seated in front of the teleregister board are perhaps one hundred quotation telephone clerks, each clerk being seated where she can see one code or section of the teleregister board.

The customers of the service, that is the brokerage houses located outside of the exchange building, have a total of perhaps five hundred direct telephone lines which connect to an automatic telephone exchange located in the exchange building. By dialing the code number associated with the security for which the customer desires a quotation, a connection is automatically established between the customer's telephone set and that of one of the five quotation telephone clerks assigned to that code. This quoation telephone clerk is in a position to provide the customer with the desired quotation.

It will be apparent that, in the above-outlined present system, the quotation information is transferred from the quotation page on the floor of the exchange to the customer through two intermediaries, namely, the teleregister operator and the quotation telephone clerk. These transferals necessarily introduce not only delay but also additional possibilities of human error. Furthermore, the large number of trained employees required to operate the present system is expensive and contributes to the lack of flexibility of the entire quotation system.

Applicant, with knowledge of the defects and disadvantages inherent in the present system, has for his overall object the provision of a quotation system which is completely automatic from the quotation page at the floor of the exchange through to the customer outside the exchange.

Another object of the present invention is to provide a quotation system utilizing repeating type magnetic recording-reproducing devices as a means of storing the quotation information and making it continuously available to the customer.

More general objects of the present invention are to provide improvements in communication systems involving repeating type magnetic recorders and to provide improvements in such repeating type magnetic recorders.

A specific object of the present invention is to provide a novel repeating type magnetic recording and reproducing system which employs a discrete length of magnetic medium rather than an endless magnetic medium.

Other objects and advantages of the present invention will become apparent from the following detailed description when taken in connection with the accompanying drawings, wherein:

Fig. 6 is a schematic and wiring diagram of a novel repeating type magnetic recorder which may be utilized in place of the conventional repeating type magnetic recorder in the present quotation system;

Fig. 7 is a schematic representation of a portion of a system wherein a plurality of quotations are recorded on the novel repeating type magnetic recorder of Fig. 6;

Fig. 8 is a schematic representation of a portion of a system similar to Fig. 7 utilizing the conventional type of repeating magnetic recorder;

Fig. 9 is a schematic representation of a modification of Fig. 8 employing a magnetic recorder having an elongated erasing head which is effective over a substantial length of the magnetic recording medium.

By "repeating type" magnetic recording-reproducing system, as used in this specification and in the appended claims, is meant one which, upon having a signal initially recorded thereon, is adapted to automatically continue to repeat the reproduction of such signal indefinitely without any manual intervention or any change in the direction of movement of the magnetic medium. In the past such "repeating type" systems have comprised exclusively systems employing an endless magnetic medium. However, in Figs. 6 and 7 of the present application, there is shown a special arrangement of a system employing a discrete length magnetic medium rather than an endless magnetic medium, which special arrangement also constitutes a "repeating type" system, as defined above.

In describing the quotation system of the present invention it will be assumed that there are exactly one thousand securities for which quotations must be supplied to five hundred customers, that is, five hundred brokerage houses. It is also assumed that under the present system each quotation page on the floor of the exchange is able to handle twenty securities. Accordingly, there are fifty quotation pages on the floor of the exchange.

Figure 1:
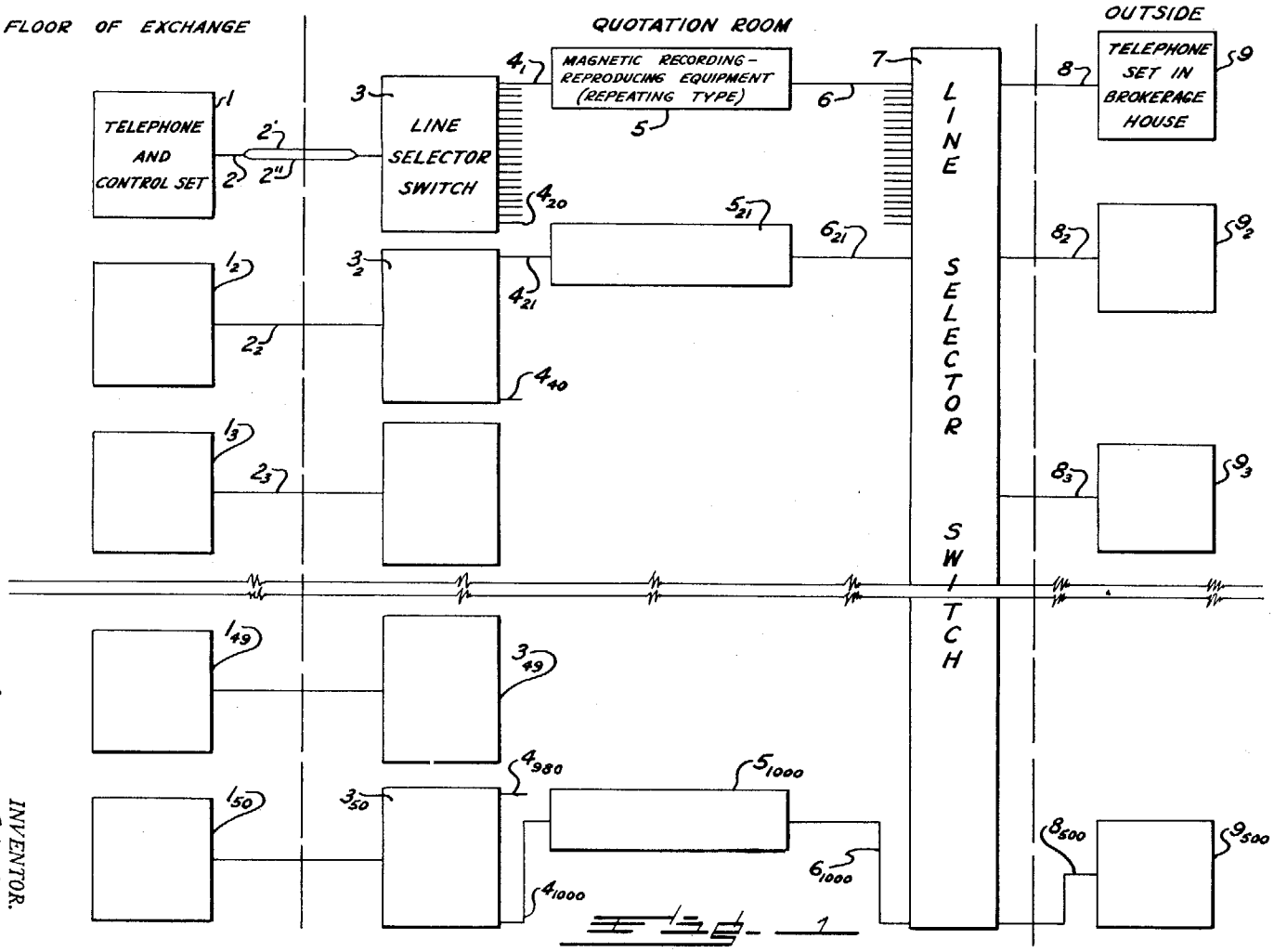
Fig. 1 is a schematic overall representation of the entire quotation system of the present invention from the quotation page at the floor of the exchange through to the brokerage houses.

Referring to Fig. 1, wherein the entire quotation system is schematically illustrated, there are shown located on the floor of the exchange fifty identical telephone and control sets numbered 1, $1_2$, $1_3$ . . . $1_{50}$, each set being assigned to and utilized by a particular one of the fifty quotation pages for supplying the quotations for the twenty securities under his jurisdiction. Each telephone and control set has associated with it a line selector switch and twenty repeating type magnetic recording-reproducing devices. Thus, telephone and control set 1 is connected by telephone line 2 (consisting of wires 2', 2'') to the associated line selector switch 3, which line selector switch connects line 2 to a particular one of the twenty lines 4, $4_2$, $4_3$ . . . $4_{20}$ which lead to the twenty magnetic recorders 5, $5_2$, $5_3$ . . . $5_{20}$, respectively. It is apparent that there is one magnetic recorder associated with each of the one thousand individual securities.

The quotation page, through his telephone and control set 1, has control over the connection made by the line selector switch 3, and, after the desired connection has been established to the desired one of the twenty magnetic recorders, he also has control over the connected magnetic recorder, that is, he can cause the magnetic recorder to repeatedly reproduce a previously recorded quotation, or erase the previously recorded quotation and record a new one, as he desires. In this manner, each of the one thousand magnetic recorders has recorded thereon by a quotation page the current quotation of the particular security assigned to it, and is thereafter left in its reproducing condition such that the quotation is sent out on the associated one of the telephone lines 6, $6_2$, $6_3$ . . . $6_{1000}$, which lines terminate in line selector switch 7.

Each of the five hundred telephone sets 9, $9_2$, $9_3$ . . . $9_{500}$ in the various brokerage offices are also connected to line selector switch 7 by private telephone lines 8, $8_2$, $8_3$ . . . $8_{500}$, respectively. The line selector switch 7 could, of course, be simply a manually operated telephone exchange, but preferably, it is an automatic dial operated exchange of any of the well known types. However, it may be a simplified form of such an automatic dial exchange in that neither a ringing signal nor D. C. talking current need be supplied to the called lines 6 to $6_{1000}$. The telephone sets 9 to $9_{500}$ may be the ordinary dial sets except that neither a transmitter nor ringing equipment is needed and these may be omitted. The operator of telephone set 9 merely dials the number corresponding to the security for which he desires a quotation, listens as the quotation is supplied by the magnetic recorder after the line selector switch 7 has made the proper connection, and then hangs up. Preferably, in order to reduce the possibility of the brokerage house receiving a busy signal, each of lines 6 to $6_{1000}$ terminate in a plurality of parallel called jacks at the line selector switch 8, all of which jacks are available for connection to any one of lines 8 to $8_{500}$. Obviously, more of such parallel jacks would be required for those of lines 6 to $6_{1000}$ which are associated with an important or popular security.

Figure 2:
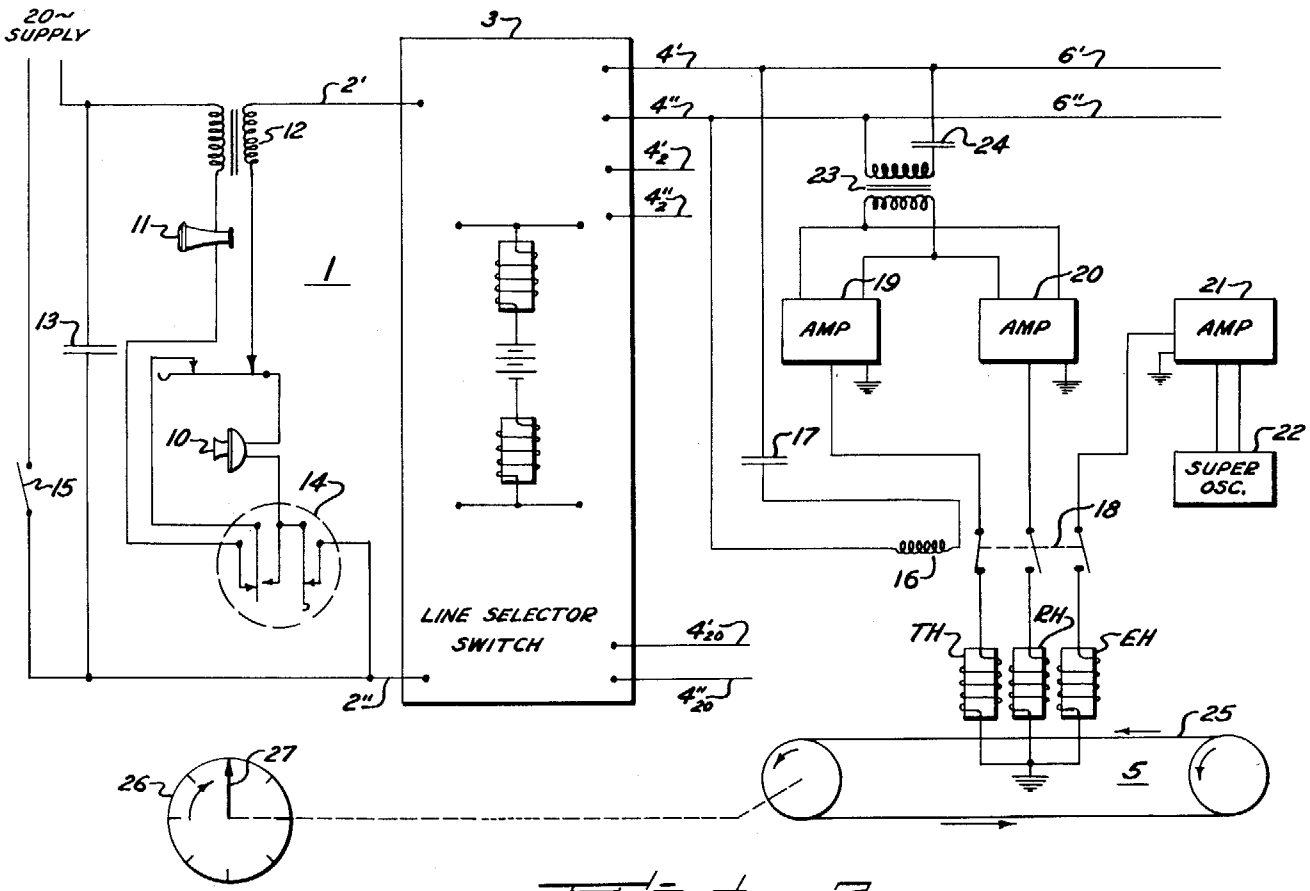
Fig. 2 is a wiring diagram of a typical portion of the system shown in Fig. 1, illustrating equipment and associated circuits which may be utilized for providing the quotation page communication with, and control over, the magnetic recorders under his jurisdiction.

Referring now to Fig. 2, wherein one method of establishing the connection to, and control over, the magnetic recorders from the telephone and control sets on the floor of the exchange is shown, telephone and control set 1 may be for the most part a conventional dial set having the usual transmitter 10, receiver 11, transformer 12, condenser 13, and rotary dial mechanism 14, all connected in the conventional manner to the outgoing telephone line consisting of wires 2', 2''. Since the noise level at the floor of the exchange may at times be rather high, transmitter 10 is preferably one of the special highly directional types developed for such service. Transmitter 10, for instance, might even be a throat microphone. Telephone set 1 is further distinguished from the conventional set in that a local source of twenty cycle alternating voltage is available for connection directly across condenser 13 by means of switch 15 under the manual control of the quotation page. When switch 15 is closed this twenty cycle signal voltage is applied across line 2', 2'' by inductive coupling through transformer 12.

The line selector switch 3 may be a much simplified conventional automatic dial operated telephone exchange. Possible simplifications, other than those arising from the single incoming calling line and the small number (twenty) of outgoing called lines, include omission of the busy signal to the calling line since the called line cannot be busy, omission of the ringing signal to the called line, and omission of the need for D. C. talking current to the called line. A typical satisfactory type of common battery connection which may be established between the incoming calling line and the called line is indicated merely for illustrative purposes at the interior of the line selector switch 3. Although the particular connection shown does provide D. C. talking current for the called line, this is not necessary, as previously stated.

The magnetic recording-reproducing equipment 5 is schematically indicated as the repeating type having an endless magnetizable medium 25, such as a tape or wire, which is continuously and repeatedly driven at a constant speed past the erasing head EH, recording head RH, and transmitting head TH. The disc type of magnetic recorder would also be suitable for this purpose. The lower terminal of the winding of each of heads EH, RH, and TH may be grounded, as indicated. The upper terminals of these windings are connected through a gang switch 18 to their respective amplifiers 21, 20 and 19. The input of the erasing amplifier 21 is fed from a suitable oscillator 22 which supplies a supersonic erasing signal. A series circuit consisting of condenser 24 and the primary of audio transformer 23 is connected across the telephone line 4', 4''. Opposite terminals of the secondary of transformer 23 are connected to the input of recording amplifier 20, and these terminals are also connected to the output of transmitting amplifier 19.

Another series circuit consisting of condenser 17 and relay winding 16 are connected across line 4', 4'', this circuit preferably being resonant at the twenty cycle frequency of the control signal. Winding 16, in conjunction with gang switch 18, forms an A. C. time delay relay designed such that when the winding 16 is momentarily energized, switch 18 is activated to its non-normal position and remains at such position for the delay period after the winding 16 has been de-energized. Relay switch 18 is shown in its normal or non-energized position, and this convention is followed for the relays shown in all of the drawings. The delay period of the relay is set equal to the cycle time of the repeating magnetic recorder 5, that is, the time required for the magnetic medium 25 to make one complete revolution around the recorder. The cycle time, in turn, is adjusted so as to be somewhat longer than the time required for the recitation of a single quotation.

In the operation of the system shown in Fig. 2, the quotation page utilizes dial 14 to establish a telephone connection to one of the twenty magnetic recorders under his jurisdiction, the connection being automatically made through the conventional automatic exchange equipment of the line selector switch 3. Fig. 2 illustrates the condition immediately after the connection has been made to one of the magnetic recorders, in this case, recorder 5. It is apparent that at this time if any quotation, such as, "three and one-eighth—three and one-quarter," had previously been impressed upon the recorder medium 25, this quotation will be continuously repeated and sent out through transmitting head TH, switch 18, amplifier 19 and transformer 23 to the telephone line 4′, 4″, as well as to line 6′, 6″, which lines are preferably connected in parallel, as shown. Accordingly, the quotation page may listen to the quotation which is currently being transmitted via line 6′, 6″ to the telephone sets in the brokerage houses which are then connected to line 6′, 6″ through the line selector switch 7.

In this way, the quotation page may monitor the information going out to the subscribers. When the quotation changes at the floor of the exchange, the quotation page momentarily closes switch 15, thus momentarily applying the twenty cycle control signal to the line. This signal momentarily energizes winding 16, thereby moving switch 18 to its non-normal position for the duration of exactly one cycle. During this cycle time, the erasing head EH is activated thus erasing completely the entire length of the recording medium 25. Also during this time, the recording head RH is coupled to line 4′, 4″ by way of transformer 23, recording amplifier 20, and switch 18 so that there will be recorded on the magnetic medium 25 any signal which appears on line 4′, 4″. Also during this time, the transmitting head TH is disconnected from the line.

After momentarily closing switch 15, the quotation page waits the fraction of an instant required for the magnetic medium to travel from the erasing head EH to the recording head RH and recites the correct current quotation into his transmitter 10, taking care to complete the quotation before the expiration of the delay period, that is, while the recorder 5 remains in its erase-record condition. At the conclusion of the delay period, switch 18 automatically returns to its original normal position and the new quotation is thereafter repeatedly transmitted to the subscribers via line 6′, 6″. The quotation page may, if he so desires, listen to the new quotation to insure that it has been satisfactorily recorded before breaking the connection and dialing a different recorder.

Since lines 4′, 4″ and 6′, 6″ are connected together, it is apparent that during the delay period, the subscriber is able to listen directly to the quotation page as he records the new quotation. Thus, there is no time delay at all between the transmittal of the new information by the quotation page and its receipt by the subscriber. If this feature, and the monitoring by the quotation page of the quotation being transmitted by the recorder, were not desired in any particular application, lines 4′, 4″ and 6′, 6″ could be disconnected from each other, line 4′, 4″ being connected only to the input of the recording circuit of the recorder and line 6′, 6″ being connected only to the output of the transmitting circuit of the recorder.

It will be apparent that the quotation page needs some idea of the duration of the delay period or cycle time in order to complete his recording of the new quotation before this period expires. Of course, if desired, the cycle time could be set much longer than the time required to speak the quotation, thus giving the quotation page so much leeway that he could not miss. Obviously, however, the service to the customer is improved by providing a cycle time as short as possible so that the pause between repetitions of the quotation will be short. Experience may be relied on to teach the quotation page the duration of the cycle time. If desired, however, the quotation page may use a stop watch, or there may be provided on the floor of the exchange one or more large dials 26 visible to the quotation pages, and having a movable pointer 27 synchronized with the magnetic recorder drive such that the pointer makes one complete revolution per cycle time of the recorder. Preferably, all of the recorders 5 to $5_{1000}$ are driven synchronously at a constant speed from a common drive so that all will have a common cycle time.

Figure 3:
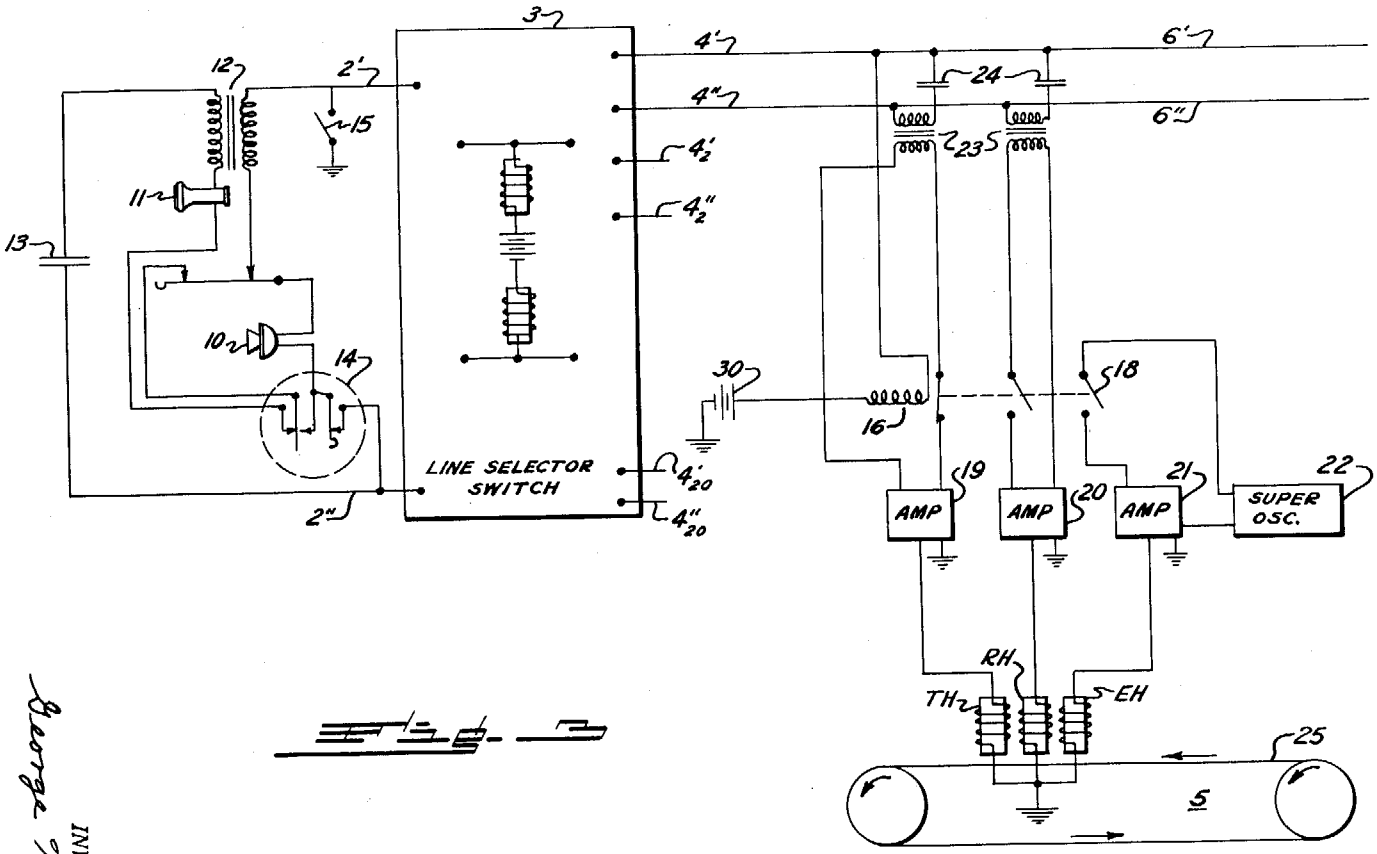
Fig. 3 is a wiring diagram illustrating a modification of the equipment and circuits shown in Fig. 2.
Figure 4:
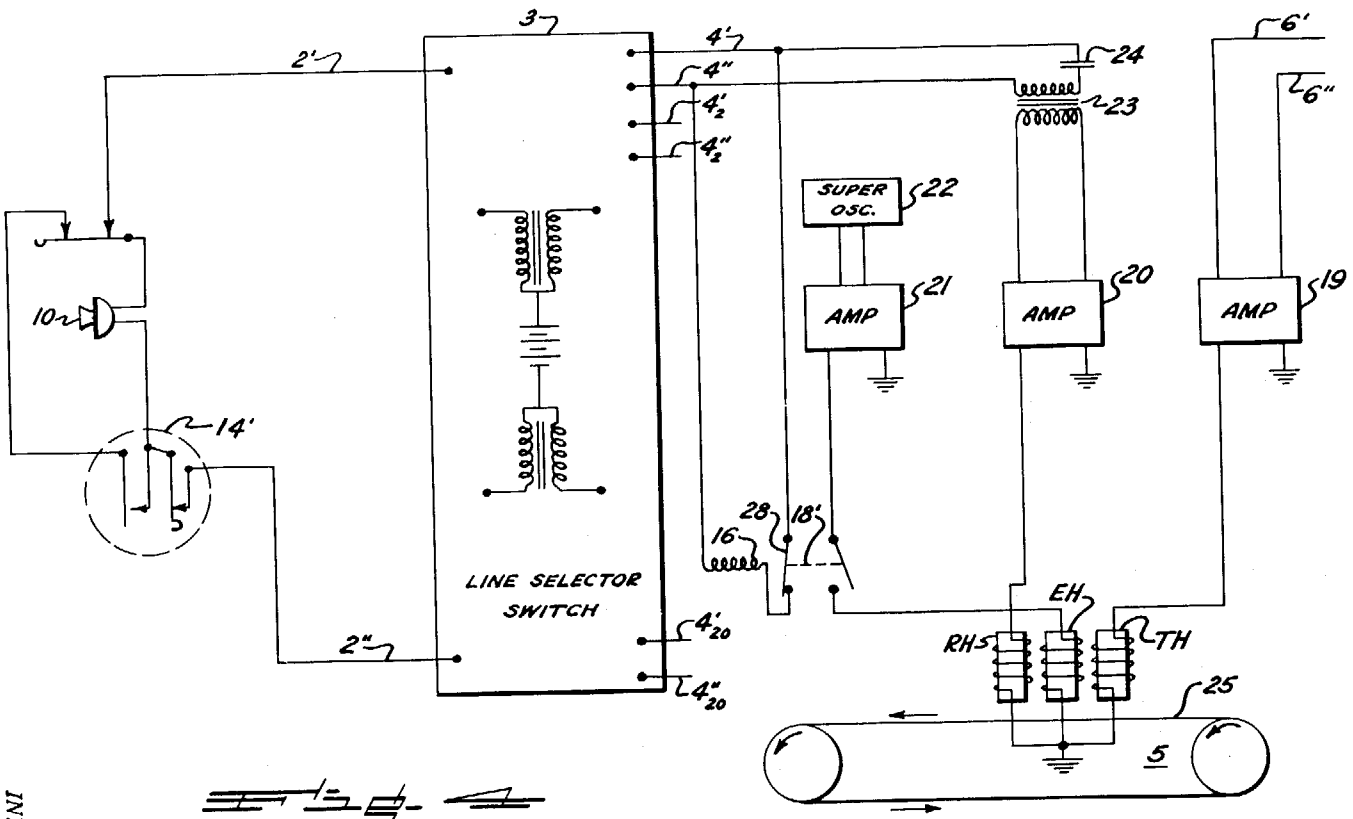
Fig. 4 is a detailed wiring diagram illustrating another modification of the equipment and circuits shown in Fig. 2.

The gang switch 18 which controls the condition of recorder 5, as between record-erase condition and transmit condition, has been shown merely for convenience as connected between the magnetic heads TH, RH and EH and their respective amplifiers 19, 20 and 21. Obviously, the control switch could be disposed prior to the respective amplifiers so as to control the amplifiers and associated magnetic heads together, as illustrated in Fig. 3. The position of the transmitting head TH with respect to the erasing head EH and recording head RH is not critical. The transmitting head TH might, for instance, be disposed on the opposite side adjacent the erasing head EH, as illustrated in Fig. 4. As a further variation, amplifiers 19 and 20 could be combined so as to constitute the single bidirectional amplifier or repeater commonly employed in telephony.

Only those portions of the magnetic recording equipment have been shown which are necessary to an understanding of the correlation between this equipment and the other components of the quotation system. It will be understood that, in general, any conventional type of repeating magnetic recording equipment may be used, and that such equipment may include customary refinements such as equalizer circuits, supersonic bias for recording, a common recording and transmitting head, etc.

It will be apparent that the connection illustrated as effected by the line selector switch 3 between the incoming calling line and the called line is merely one of the conventional common battery types of connection, and that any other conventional type, such as the impedance coil-condenser type, or the repeating coil type, would also be satisfactory. Also, the connection of line 2′, 2″ to the called line need not be automatically accomplished. This connection could be accomplished manually by an operator at a conventional manual switchboard, in which case, of course, the dial mechanism 14 would be unnecessary and could be omitted. Further, while the telephone set 1 is illustrated as utilizing a sidetone circuit, any conventional circuit, such as a sidetone reduction circuit, or an antisidetone circuit might be utilized.

If the quotation page is supplied with a stop watch, or if the dial 26 and pointer 27 timing indicator is provided on the floor of the exchange, the system shown in Fig. 2 is susceptible of a somewhat different type of operational procedure which would permit the omission of the time delay feature of the relay comprising winding 16 and switch 18. Thus, instead of closing the control switch 15 only momentarily as previously described, the quotation page might hold switch 15 closed for exactly one complete cycle, as indicated to him on dial 26. In such case, of course, the control relay would be of the non-delay type such that switch 18 is always in its normal position when winding 16 is not energized and in its non-normal position when winding 16 is energized.

The twenty cycle control signal is to be understood merely as representative of a suitable signal for operating the relay consisting of switch 18 and winding 16. Any remote control system for controlling the position of switch 18 from the telephone and control set 1 would, of course, be satisfactory. Preferably, however, in order to reduce the total amount of wiring required, the remote control system employed should be one which can utilize the telephone line, itself, for the transmission of the control signal.

Referring now to Fig. 3, wherein a D. C. control signal rather than the twenty cycle control signal is utilized to control the position of gang switch 18 and therefore the condition or status of the magnetic recorder, control switch 15, in this case, effects the momentary grounding of wire 2′ when momentarily closed by the quotation page. In this case, no local twenty cycle supply is needed and this supply is omitted. The control relay consisting of winding 16 and gang switch 18 is in this case a D. C. time delay relay. One terminal of winding 16 is connected to the wire 4' which is connectable to wire 2' through the line selector switch 3, and the other terminal of winding 16 is connected to ground through a local battery 30. It is contemplated that a common battery 30 may be employed for all of the one thousand windings 16 associated with the respective one thousand magnetic recorders. In operation, it is obvious that the momentary closing of switch 15 by the quotation page effects the momentary energization of winding 16, and this, in turn, effects the movement of gang switch 18 to its non-normal position for the duration of the delay or cycle time. Otherwise, the operation of the system shown in Fig. 3 is identical to that previously described with respect to Fig. 2.

Referring now to Fig. 4, wherein the condition of the magnetic recorder is not under the control of the quotation page at all, but rather is automatically controlled through the operation of the line selector switch 3, the telephone set of the quotation page, in this case, has the receiver and its associated mechanism omitted. Also in Fig. 4, the output of the transmitting circuit of the recorder is permanently coupled to line 6', 6'', and the input of the recording circuit of the recorder is permanently coupled to line 4', 4'', that is, these connections do not include a switching element of time delay relay switch 18'. Switch 18' does, however, include a new switching element 28 which is connected in series with the D. C. relay winding 16, this series circuit being connected directly across line 4', 4''. The normal position of switching element 28 is closed, as shown. In Fig. 4, lines 4', 4'' and 6', 6'' are not interconnected.

In the operation of the circuit of Fig. 4, it is apparent that the mere establishment of the line connection to line 4', 4'' by the line selector switch 3 is sufficient to energize relay winding 16 from the common battery of the line selector switch 3. As before, energization of winding 16 effects the movement of gang switch 18' to its non-normal position for the duration of the delay period or cycle time. During this time, the old incorrect quotation is automatically erased and the quotation page records the new correct quotation. He also hangs up prior to the termination of the delay period. As a result of his hanging up, the line selector switch 3, of course, automatically breaks the circuit to line 4', 4''. Thus, by the time that the delay period has expired and switch element 28 has returned to its normal closed position, the circuit through the common battery of line selector switch 3 has been broken and relay winding 16 therefore remains de-energized until such time as the quotation page again dials the number corresponding to telephone line 4', 4''.

Merely as illustrative of a satisfactory variation, the common battery connection established by the automatic line selector switch 3, in this case, has been shown as the repeating coil type.

It will be apparent that in the circuit of Fig. 4 the quotation page is not able to monitor the quotation being transmitted by the twenty recorders under his jurisdiction. Accordingly, when this type of circuit is employed it is of somewhat more importance that the dial 26 and associated pointer 27 of Fig. 2 be provided in order to insure that the quotation page accomplishes the recording of the new quotation and the breaking of the circuit during the delay period.

Figure 5:
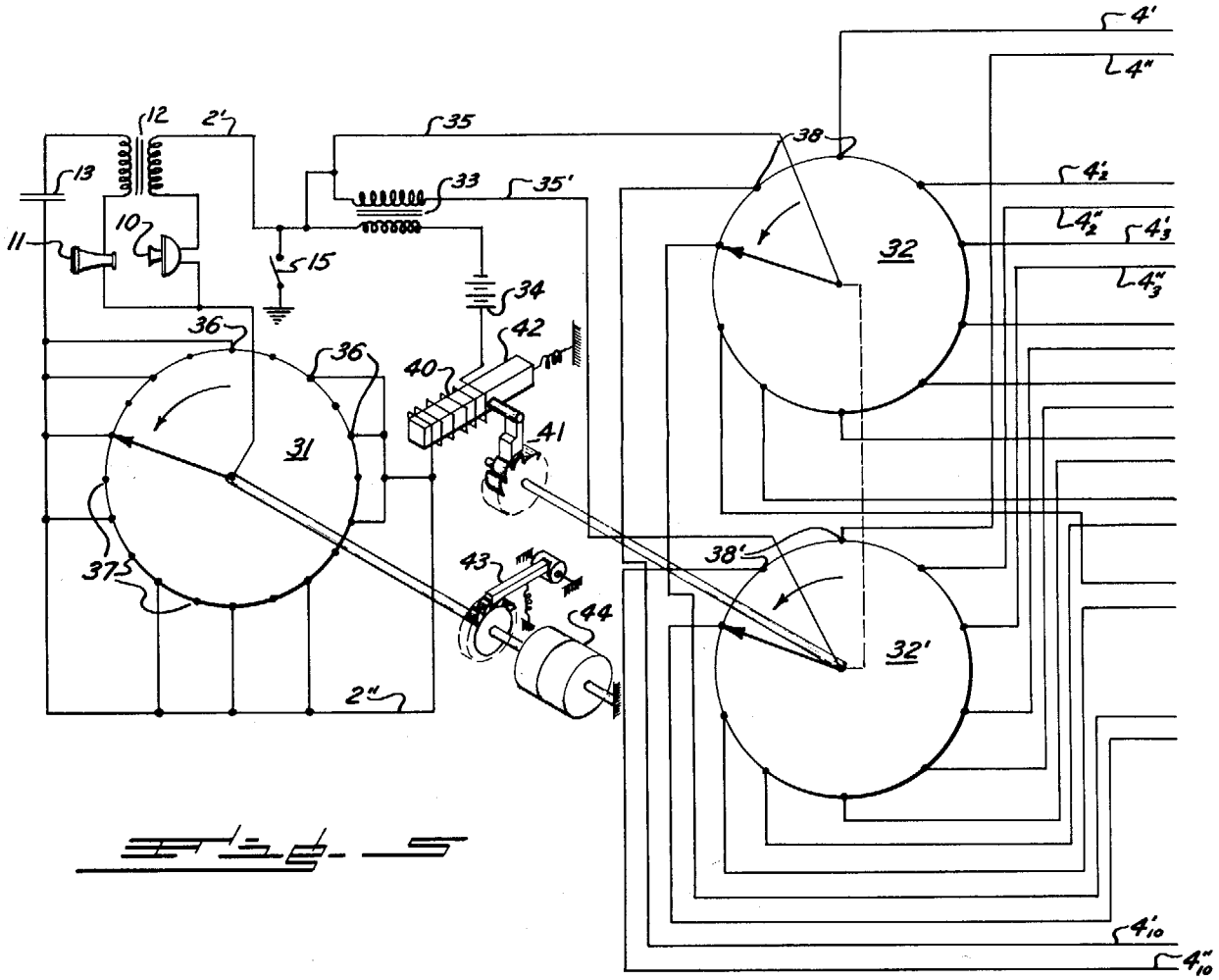
Fig. 5 is a wiring diagram of a non-dial operated automatic switching system which may be used in the present invention in place of the conventional dial operated automatic telephone exchange.
Figure 4:
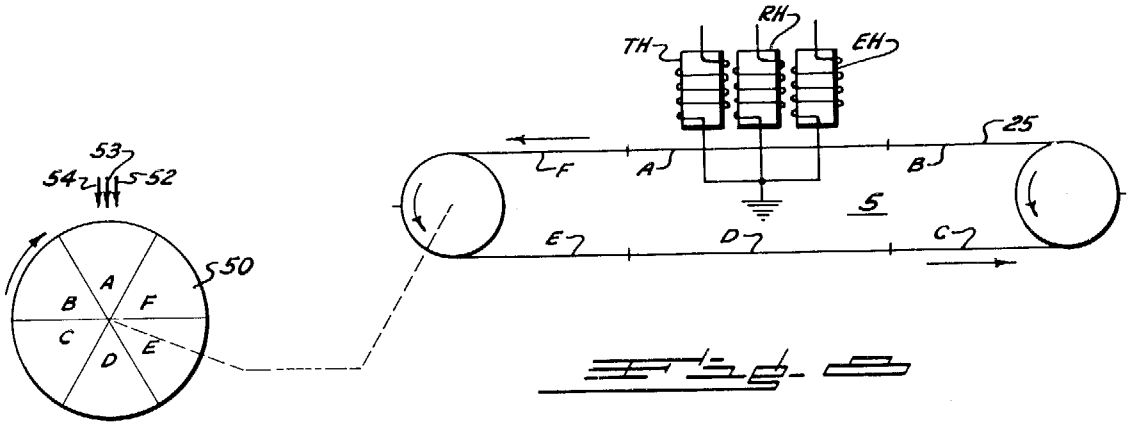
Figure 5:
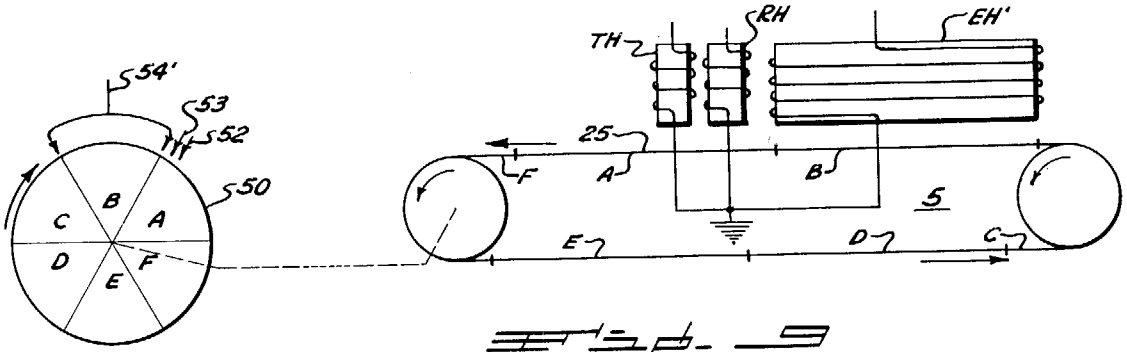

In Fig. 5, there are shown the details of an electromechanical arrangement for establishing the connection between line 2', 2'' and the desired one of lines 4', 4''; $4_2'$, $4_2''$; . . . $4_{20}'$, $4_{20}''$, which arrangement is somewhat different from the conventional dial controlled automatic exchange equipment called for in the preceding figures.

In order to simplify the drawing, it is assumed in this particular case, that the quotation page has only ten magnetic recorders under his jurisdiction instead of twenty, and that therefore there are only ten called lines 4', 4''; $4_2'$, $4_2''$; . . . $4_{10}'$, $4_{10}''$.

Merely as illustrative of a satisfactory variation, the telephone set of the quotation page is indicated, in this case, as incorporating a sidetone reduction circuit. The lower terminal of the transmitter 10 is connected to the slider arm of a manually operable rotary selector switch 31. Switch 31 has ten active or "on" positions, as indicated by terminals 36, and ten intermediate or "off" positions, as indicated by terminals 37. All of the terminals 36 are connected directly to telephone wire 2''. Wire 2'' is connected through relay winding 40, battery 34, and the primary of transformer 33 back to line 2'. Opposite terminals of the secondary winding of transformer 33 are connected, as by wires 35, 35', to the respective slider arms of rotary switches 32, 32', which rotary switches are mechanically tied together so as to operate in synchronism with each other. Wires 2' and 35 are electrically interconnected, as shown.

Rotary switches 32, 32' each have ten active positions, as indicated by terminals 38, 38', respectively, which active positions correspond to the active positions 36 of rotary switch 31. As shown, the telephone lines 4', 4''; $4_2'$, $4_2''$; etc., which lead to the respective magnetic recorders, are connected to the terminals 38, 38' in such a way that a connection is established between telephone line 35, 35' and a particular one of the telephone lines 4', 4''; $4_2'$, $4_2''$; etc. depending upon the position of switches 32, 32'. It is apparent also that telephone line 35, 35' and telephone line 2', 2'' are coupled through transformer 33.

The slider arms of switches 32, 32' are actuated by means of relay winding 40 through the relay plunger 42 and pawl and ratchet arrangement 41, the pawl of which is pivotally mounted on the plunger 42. Thus, each time the relay winding 40 is energized (as shown) the slider arms of rotary switches 32, 32' advance in the direction indicated one position, and when the relay winding 40 is de-energized the slider arms of rotary switches 32, 32' remain stationary.

The slider arm of rotary switch 31, rather than being mounted to be freely movable, is mechanically mounted by way of a pawl and ratchet arrangement 43 and a friction coupling 44. Ratchet arrangement 43 permits manual rotation of the slider arm of rotary switch 31 in only one direction, as indicated by the arrow, and the friction device 44 restrains the angular velocity with which the slider arm of switch 31 can be rotated to a reasonable rate which may be followed by the electromagnetic relay mechanism associated with switches 32, 32'.

If we initially assume that the slider arm of switch 31 is in an "off" position and is then moved to the next "on" position, it will be apparent that relay winding 40 is thereby energized and the slider arms of switches 32, 32' are both advanced one position. If the slider arm of switch 31 is then advanced to the next "off" position, relay winding 40 is de-energized and the slider arms of switches 32, 32' remain stationary. Accordingly, the slider arms of switches 32, 32' remain at all times synchronized with the slider arm of switch 31 except when the latter is in an "off" position, in which case the position of switches 32, 32' correspond to the preceding active position of switch 31.

Each of the active terminals 36 of rotary switch 31 correspond to one of the ten magnetic recorders under the jurisdiction of the quotation page and these terminals are so labelled. Accordingly, in order to establish a telephonic connection between his telephone set and any desired one of the magnetic recorders under his jurisdiction, the quotation page simply positions the slider arm of switch 31 at the terminal corresponding to that magnetic recorder. There is thus established a connection between his telephone line 2', 2'' and the telephone line associated with that magnetic recorder. When the telephone set is to be inactive for any substantial period of time, the quotation page places the slider of rotary switch 31 in any of the "off" positions, thereby completely breaking the circuit through the common battery 34.

It will be apparent that the "off" positions of switch 31 are not absolutely necessary as a switch in series with wire 2'' could be employed to disconnect the common battery. If such a system were employed, switches 32, 32' could be maintained completely synchronized at all times with switch 31. This complete synchronization could be obtained by means of any conventional remote positional control or follow-up system instead of the electromagnetic relay system shown.

Furthermore, if, in any particular application, it were not found inconvenient to bring all the telephone lines 4', 4''; $4_2'$, $4_2''$; etc. to the station manned by the quotation page, the remote control feature of switches 32, 32' could be entirely omitted, that is, these two switches could be located near the quotation page so as to be directly operable by him. In such case, switch 31, relay winding 40 and transformer 33 could be omitted, and the lower terminal of transmitter 10 could be connected directly to wire 2'' through an on-off switch, wire 2'' being connected directly to wire 35'.

In the circuit of Fig. 5 control of the condition or status of the connected magnetic recorder is indicated as being effected by way of switch 15 and a D. C. relay winding 16 and local battery 30, as described with respect to Fig. 3. If the A. C. control system of Fig. 2 were employed, the interconnection of wires 2' and 35 could be omitted.

In Fig. 6, there is disclosed a magnetic recorder, which, although not of the type having an endless revolving magnetic medium, is nevertheless adapted to replace the magnetic recorder shown in the previous figures. The magnetic recorder 5' in this case has a magnetic recording medium which winds onto the left hand take-up drum and off of the right hand supply drum. Provisions well known in the magnetic recorder art may be employed to maintain constant the linear velocity of the magnetic medium as it passes the magnetic heads RH and TH despite the varying effective external diameter of the drums. Sufficient magnetic tape or wire, as the case may be, is originally provided on the supply drum to last the entire trading day of the exchange—usually five hours.

In this case, no erasing head EH is provided and the recording head RH is maintained operatively coupled to lines 4', 4'' and 6', 6''. The sole switch controlled from the time delay relay winding 16 is switch 18'' which, in its non-normal position, effectively disconnects the transmitting head TH from the line, as before. Control of the time delay relay consisting of winding 16 and switch 18'' may be obtained in the same manner as described with respect to Fig. 3, that is, by the quotation page momentarily closing switch 15 and thus grounding wire 2'' when he desires to change the recorded quotation. The A. C. control system of Fig. 2 may be employed, if desired.

The delay period in this case is the time required for a point on the magnetic medium 25' to transverse the distance between the recording head RH and the transmitting head TH. This time, as before, should be somewhat longer than the time required to speak a quotation.

When the magnetic recorder is in its transmitting condition, that is, when switch 18 is in its closed normal position, the transmitting head will impress upon line 6', 6'' the quotation which has been previously recorded on that portion of the magnetic medium 25' which lies between the transmitting head and the recording head. At the same time, the identical signal is being received by the recording head RH and is being again recorded on an adjacent clean portion of the magnetic medium 25'. When this newly recorded portion of the magnetic medium passes the transmitting head TH the whole process occurs all over again. It will be apparent therefore that a quotation once recorded will repeatedly be transmitted over line 6, 6'.

When the quotation page desires to change the quotation, he momentarily closes switch 15 of Fig. 3, thereby rendering the transmitting head TH ineffective for the delay period. The recording head RH then records the new quotation impressed upon line 2, 2' by the quotation page. As before, the quotation page must complete the quotation during the delay period.

An important advantage of the system shown in Fig. 6 is that at the end of the day the day's quotations are permanently and chronologically recorded on the magnetic medium stored on the left hand drum. This record may be useful for legal purposes or as a check on the efficiency of the quotation page.

In the quotation system of the present invention as it has thus far been described, one magnetic recorder is provided for each individual security. In some instances, this may be unwarranted, particularly for unpopular, or slow moving securities, the quotations for which do not change very rapidly. Accordingly, it may be desirable to have one magnetic recorder continuously repeat the quotations for a group of securities. It will be apparent that the previously described systems are adapted without change to accomplish this with the one limitation that the quotation page treat the entire group as a unit, that is, the quotation page, in order to change the recorded quotation of one security of the group, would have to erase and re-record the quotations for the whole group. The delay period or cycle time would then, of course, be the time required to recite the whole group of securities. The call letters of each security would also have to be recited along with the quotation for identification purposes. If the group comprised all of the securities assigned to a particular telephone and control set 1, the associated line selector switch 3 could be omitted and a direct permanent connection made between the telephone and control set and the associated single magnetic recorder.

The quotation systems illustrated in the remaining figures have reference to systems wherein, notwithstanding the fact that a group of securities is assigned to a recorder, the quotation page is not required to treat the group as a unit, but rather, may erase and re-record any desired one of the group. In all of the following figures, it is assumed purely for illustrative purposes that a group of six securities, designated A, B, C, D, E, and F, is assigned to the magnetic recorder.

In Fig. 7, there is illustrated how the system of Fig. 6 may be adapted to this kind of operation. The system of Fig. 7 will be understood to include everything included in the system of Fig. 6 and, in addition, the rotating dial 50 and fixed index 51 arrangement which is located remotely from the magnetic recorder in a position visible to the quotation page.

Dial 50 is rotated in synchronism with the magnetic recorder drive such that it makes one complete revolution in the time required for the magnetic recorder to traverse the distance from the recording head RH to the transmitting head TH. The dial 50 is visibly divided into six equal sectors labelled in accordance with the call letters of the six securities A, B, C, D, E, F, as shown. The magnetic medium 25' may be thought of as having repeating groups of six equal portions or lengths, each portion being assigned to a particular security, as indicated.

It will be apparent therefore that the dial and index arrangement provides the quotation page with an exact visible representation of the instantaneous spatial relationship which exists at the recorder, index 51 having the same spatial relationship, with respect to the sectored dial 50 as the transmitting head TH and recording head RH have with respect to the recorded quotations on the magnetic medium 25'.

The control relay consisting of winding 16 and switch 18'' may be a time delay relay or not. If a time delay relay is employed, the delay period is set equal to one-sixth of the time required for the magnetic medium to traverse the distance from the recording head RH to the transmitting head TH. If the quotation page desires to change a particular quotation, for example B, and a time delay relay is provided, he momentarily closes his control switch 15 at the instant that the B sector first reaches the index 51. He then recites the correct new B quotation during the interval in which the B sector is passing under index 51, completing his recitation before the C sector reaches the index. If a time delay relay is not employed, the procedure is identical except that the quotation page must hold his control switch 15 closed during the entire interval in which the B sector is passing beneath index 51.

In a similar manner, the conventional type of repeating magnetic recorders shown in Figs. 2, 3, and 4 may readily be employed in this type of system. This is illustrated in Fig. 8, wherein the equipment may be considered as identical to that of Figs. 2 or 3 except for the dial 50 and indices 52, 53, and 54, which indices have the same spatial relationship with respect to sectored dial 50 as the magnetic heads TH, RH, and EH, respectively, have with respect to the portions of the magnetic medium assigned to the respective quotations A through F.

The index 54, corresponding to the erasing head EH, is the only one of the indices which is really essential. In operation, the procedure of the quotation page is identical with that described with respect to Fig. 7, in this case index 54 corresponding to index 51 of Fig. 7. Index 53, corresponding to the recording head RH, may be used by the quotation page to provide an exact indication of the fraction of an instant he must wait after initiating the erasing condition by control switch 15 before he may start reciting the new recording. Index 52 corresponding to the transmitting head TH may be utilized while monitoring to provide a check on the synchronism between the recorded quotations A through F and the corresponding sectors of dial 50. If a time delay relay is used for control of the condition of the recorder in Fig. 8, the delay period is set equal to one-sixth of the time required for the magnetic medium 25 to make one complete revolution around the recorder.

The system shown in Fig. 9 is identical to that of Fig. 8 with the following exceptions. The erasing head EH' is physically elongated to the extent that its magnetic field of influence covers one-sixth of the entire length of the magnetic medium 25, that is, the length assigned to one quotation, such as B. Thus, a momentary excitation of the erasing head EH' is sufficient to erase exactly one quotation in its entirety. Index 54', corresponding to erasing head EH', is similarly elongated to cover one complete sector of the rotating dial 50. In this case, two control relays are provided to control the condition of the magnetic recorder, both relays being energized from the same control signal. One relay is a time delay relay controlling the switching elements which are in series with the recording and transmitting circuits of the recorder, the same as in Fig. 3. A separate relay having no time delay feature is provided to control the position of the switching element which is in series with the erasing circuit of the recorder.

In operation, the quotation page waits until the index 54' is aligned exactly with the sector which corresponds to the quotation he desires to change. At that instant, he momentarily closes his control switch 15, thereby instantaneously erasing the incorrect quotation in its entirety. As before, he then waits the fraction of an instant required for the sector corresponding to the erased quotation to reach index 53 which corresponds to the recording head RH, and then recites the new quotation while this sector is passing beneath index 53.

Since many changes could be made in the above construction, and many apparent widely different embodiments of this invention could be made without departing from the scope thereof, it is intended that all matter contained in the above description, or shown in the accompanying drawings, shall be interpreted as illustrative and not in a limiting sense.

What is claimed is:

[1. In a telephonic communication system, in combination, a telephone line, a repeating type magnetic recorder having a recording head and a transmitting head and a movable magnetic medium operatively associated with said heads, circuit means for coupling the input of said recording head and the output of said transmitting head to said telephone line, said circuit means including a switch for uncoupling the output of said transmitting head from said telephone line, and means for continuously driving said magnetic medium irrespective and independently of the presence of any voltage signal across said line.]

2. Apparatus, as claimed in claim 1, said magnetic recorder being of the type having its magnetizable medium adapted to be wound off of a supply drum onto a take-up drum and said transmitting head being spaced a substantial distance from said recording head in the direction of movement of the magnetizable medium.

3. In a communication system, repeating type magnetic recording reproducing equipment comprising a movable magnetizable medium, a supply drum for said magnetizable medium, a take-up drum for said magnetizable medium, a recording head and associated circuit, a transmitting head and associated circuit, and circuit means feeding the output of said transmitting circuit back to said recording circuit as an input thereto.

4. In a telephonic communication system, in combination, a telephone line, a repeating type magnetic recorder having a recording circuit and a transmitting circuit, circuit means for coupling both the input of said recording circuit and the output of said transmitting circuit to said line, said circuit means including a relay operated switch for rendering ineffective the coupling between the output of said transmitting circuit and said telephone line, and a relay winding, electrically connected to said line, for controlling said switch.

[5. In a telephonic communication system, in combination, a telephone and control set, a telephone line associated with said set, a plurality of remotely positioned repeating type magnetic recording-reproducing devices, selective switching means for electrically connecting said line to a selected one of said recording-reproducing devices, a first manually operable control means disposed at said set for controlling the operation of said switching means, and a second manually operable remote control means disposed at said set for selectively controlling the effective operative connection between said line and the connected recording-reproducing device as between a connection wherein a signal appearing on said line is recorded by said recorder, on the one hand, and a connection wherein a signal previously recorded by said recorder is reproduced and impressed upon said line.]

6. In a telephonic communication system, a telephone set; a plurality of repeating type magnetic recorders, each having a telephone line associated therewith; selective switching means for connecting said telephone set to any one of said telephone lines; each of said recorders having associated therewith an input recording circuit and an output transmitting circuit, said circuits both being electrically coupled to the associated telephone line, a relay operated switch controlling the operative condition of the recorder as between record condition and transmit condition, and a relay winding, electrically connected to the associated telephone line, for controlling said relay operated switch; and manually operable means at said telephone set for effecting the energization of the relay connected to the telephone set.

7. In a telephonic communication system, a telephone and control set; a plurality of magnetic recorders each having a telephone line associated therewith; selective switching means for connecting said telephone and control set to any one of said telephone lines; each of said recorders having associated therewith an input recording circuit and an output transmitting circuit, a relay operated switch operatively connecting said recording circuit to the associated line, and a relay winding, electrically connected to the associated line, for controlling the position of said relay operated switch; and manually operable means at said telephone and control set for energizing the relay connected to that telephone line which is currently connected to the telephone and control set.

8. In a telephonic communication system, a telephone and control set; a plurality of magnetic recorders each having a telephone line associated therewith; selective switching means for connecting said telephone and control set to any one of said telephone lines; each of said recorders having an operative connection to the associated line and also having relay operated switch means in said connection for controlling the operative relationship between said recorder and said line as between a relationship wherein a signal appearing on said line is recorded by the recorder and a relationship wherein a signal previously recorded is reproduced and impressed upon said line, each of said recorders also having a relay winding, electrically connected to the associated line, for controlling said relay operated switching means, whereby said relay is responsive to a control signal impressed upon the associated line; and manually operable means disposed at said telephone and control set for impressing the control signal upon that line to which the telephone and control set is currently connected.

[9. In a telephonic communication system, in combination, first and second telephone sets, a telephone line, means for establishing a connection between said first set and said line, means for establishing a connection between said second set and said line, a repeating type magnetic recorder having a recording input connection and a transmitting output connection, circuit means for coupling both of said connections to said telephone line, switching means associated with said recorder for controlling the operative condition of said recorder as between record condition and transmit condition, and remote control means associated with one of said telephone sets for controlling said switching means.]

10. In a telephonic communication system, in combination, first and second telephone sets, a telephone line, means for establishing a connection between said first set and said line, means for establishing a connection between said second set and said line, a repeating type magnetic recorder having a recording head and a transmitting head, circuit means for coupling both the input of said recording head and the output of said transmitting head to said line, said circuit means including a relay operated switch for uncoupling the output of said transmitting head from said line, and a relay winding for controlling said switch, said winding being electrically connected to said line to be responsive to a control signal impressed upon said line, and manually operable means at one of said telephone sets for impressing said control signal on said line.

11. An apparatus, as claimed in claim 10, wherein said control signal constitutes an alternating signal of a frequency not in the normal voice range.

12. Apparatus, as claimed in claim 10, wherein said control signal constitutes a D. C. signal with ground return.

13. In a telephonic communication system, in combination, first and second telephone sets, a telephone line, means for establishing a connection between said first set and said line, means for establishing a connection between said second set and said line, a repeating type magnetic recorder having a recording input connection and a transmitting output connection, circuit means for coupling both of said connections to said telephone line, a time delay relay operated switch associated with said recorder for controlling the operative condition of said recorder as between record-erase condition and transmit condition, a time delay relay winding for controlling said switch, the delay of said relay being set equal to the cycle time of said recorder, and manual means located at one of said telephone sets for effecting the momentary energization of said time delay relay winding.

14. In a telephonic communication system, in combination, a telephone line, a repeating type magnetic recording-reproducing device having a recording head, a transmitting head, and an erasing head, means for generating an erasing signal for said erasing head, circuit means for coupling said recording head and transmitting head to said telephone line and said erasing head to said generating means, said circuit means including a relay operated gang switch having a switching element associated with each of said heads, the normal position of said switch being such as to uncouple the recording head from said line and uncouple the erasing head from said generating means, and the non-normal position of said switch being such as to uncouple said transmitting head from said line, and a relay winding, electrically connected to said line, for controlling the position of said switch.

15. In a telephonic communication system, in combination, a telephone line, a repeating type magnetic recorder having a recording circuit and a transmitting circuit, circuit means for coupling both the input of said recording circuit and the output of said transmitting circuit to said line, a movable dial and fixed index arrangement located at a remote termination of said line and means for driving said dial synchronously with respect to said magnetic recorder, said dial being divided into a number of equal sectors.

16. In a communication system, a movable magnetizable medium, a supply drum for said magnetizable medium, a take-up drum for said magnetizable medium, a drive for at least one of said drums, a recording head and associated circuit, a transmitting head and associated circuit, circuit means feeding the output of said transmitting circuit back to said recording circuit as an input thereto, an indicator arrangement consisting of a dial element and a pointer element, and means for rotating one of said elements at a rate such that it makes one complete revolution in the interval required for the magnetizable medium to traverse the distance between said recording head and said transmitting head.

17. Apparatus, as claimed in claim 16, wherein said dial element is divided into a plurality of equal sectors.

18. In a communication system, a magnetizable medium, a recording head and an erasing head associated with said magentizable medium, motive means for driving said magnetizable medium past said heads, a rotatable dial, fixed indices associated with said dial, said indices being spatially related to said dial and to each other in the same way that said heads are spatially related to said magnetic medium and to each other, and means for driving said dial synchronously with respect to said magnetic medium.

19. In a communication system, repeating type magnetic recording-reproducing equipment comprising a movable magnetizable medium, a supply drum for said magnetizable medium, a take-up drum for said magnetizable medium, a recording head and associated circuit, a transmitting head and associated circuit, circuit means feeding the output of said transmitting circuit back to said recording circuit as an input thereto, and electrical transmission voice channel, means connected to said channel for converting electrical variations to corresponding atmospheric pressure variations, and means for coupling the output of said transmitting circuit to said channel.

20. In a communication system, repeating type magnetic recording-reproducing equipment comprising a movable magnetizable medium, a supply drum for said magnetizable medium, a take-up drum for said magnetizable medium, a recording head and associated circuit, a transmitting head and associated circuit, circuit means feeding the output of said transmitting circuit back to said recording circuit as an input thereto, an electrical transmission voice channel, circuit means for coupling the output of said transmitting circuit to said channel, means connected to said channel for converting electrical variations to corresponding atmospheric pressure variations, and a switch for rendering ineffective said transmitting head.

21. In a communication system, repeating type magnetic recording-reproducing equipment comprising a movable magnetizable medium, a supply drum for said magnetizable medium, a take-up drum for said magnetizable medium, a recording head and associated circuit, a transmitting head and associated circuit, circuit means feeding the output of said transmitting circuit back to said recording circuit as an input thereto, an electrical transmission voice channel, circuit means for coupling the output of said transmitting circuit and the input of said recording circuit to said channel, means for initially impressing a voltage signal representing vocal intelligence on said channel, and means for rendering said transmitting head ineffective during such initial impression.

22. In a telephonic communication system, in combination, a telephone line, a repeating type magnetic recorder having a movable magnetic medium, a recording circuit, and a transmitting circuit, circuit means for coupling both the input of said recording circuit and the output of said transmitting circuit to said line, said circuit means including a relay operated switch for rendering ineffective the coupling between the output of said transmitting circuit and said telephone line, a relay winding, electrically connected to said line, for controlling said switch, and means for continuously driving said magnetic medium irrespective and independently of the presence of any voltage signal across said telephone line.

23. In a telephonic communication system, in combination, a telephone line, a repeating type magnetic recording-reproducing device having a recording head, a transmitting head, an erasing head, and a movable magnetic medium operatively associated with said heads, means for generating an erasing signal for said erasing head, circuit means for coupling said recording head and transmitting head to said telephone line and said erasing head to said generating means, said circuit means including a relay operated gang switch having a switching element associated with each of said heads, the normal position of said switch being such as to uncouple the recording head from said line and uncouple the erasing head from said generating means, and the non-normal position of said switch being such as to uncouple the transmitting head from from said line, a relay winding, electrically connected to said line, for controlling the position of said switch, and means for continuously driving said magnetic medium irrespective and independently of the presence of any voltage signal across said telephone line.

24. [In a telephonic communication system, in combination, a telephone line, a repeating type magnetic recorder having a recording head and a transmitting head and a movable magnetic medium operatively associated with said heads, circuit means for operatively connecting said magnetic recorder to said line, said circuit means including a two position switch having a switching element associated with each of said heads, the normal position of said switch being such as to make a connection between the transmitting head and said line and to break a connection between the recording head and said line and the non-normal position of said switch being such as to make a connection between the recording head and said line and to break a connection between the transmitting head and said line, and means for continuously driving said magnetic medium irrespective and independently of the presence of any voltage signal across said line.]

25. In a telephonic communication system, in combination, a telephone line, a repeating type magnetic recorder having a recording head and a transmitting head and a movable magnetic medium operatively associated with said heads, circuit means for operatively connecting said magnetic recorder to said line, said circuit means including a two position relay operated switch having a switching element associated with each of said heads, the normal position of said switch being such as to make a connection between the transmitting head and said line and to break a connection between the recording head and said line and the non-normal position of said switch being such as to make a connection between the recording head and said line and to break a connection between the transmitting head and said line, means for continuously driving said magnetic medium irrespective and independently of the presence of any voltage signal across said line, and a relay winding, electrically connected to said line, for controlling the position of said switch.

26. In a telephonic communication system, in combination, a telephone line, a repeating type magnetic recorder having a recording circuit and a transmitting circuit, circuit means for operatively connecting said magnetic recorder to said line, said circuit means including a two position relay operated switch, the normal position of said switch being such as to make a connection between the output of said transmitting circuit and said line and to break a connection between the input of said recording circuit and said line and the non-normal position of said switch being such as to make a connection between the input of said recording circuit and said line and to break a connection between the output of said transmitting circuit and said line, and a relay winding, electrically connected to said line, for controlling the position of said switch.

27. In a telephonic communication system, in combination, a telephone line, a repeating type magnetic recorder having a recording circuit and a transmitting circuit, circuit means for operatively connecting said magnetic recorder to said line, said circuit means including a two position relay operated switch, the normal position of said switch being such as to make a connection between the output of said transmitting circuit and said line and to break a connection between the input of said recording circuit and said line and the non-normal position of said switch being such as to make a connection between the input of said recording circuit and said line and to break a connection between the output of said transmitting circuit and said line, a relay winding, electrically connected to said line, for controlling the position of said switch, and means for continuously driving said magnetic medium irrespective and independently of the presence of any voltage signal across said line.

*28. In a telephonic communication system, in combination, an operator's telephone and control set having an operator's transmitter and an operator's receiver and an operator's telephone line associated therewith, a gang of remotely positioned repeating type magnetic recording-reproducing devices each having an endless movable magnetic medium associated therewith, a gang of telephone lines each connected to an associated one of said recording-reproducing devices, means for connecting said operator's line to a selected one of the lines associated with said devices, said last named means including a device selective switching means, first manually operable control means disposed at said set, and means responsive to actuation of said control means for selectively remotely controlling the position of said device selective switching means, a gang of condition selective switching means, each adapted to selectively control the effective operative connection between an associated one of said devices and its associated telephone line as between a connection wherein a signal previously recorded on the*

*device is reproduced and impressed upon its associated line, on the one hand, and a connection wherein a signal previously recorded on the device is erased and a new signal appearing on the associated line is simultaneously recorded on the device, on the other hand, a second manually operable control means disposed at said set, means responsive to actuation of said second control means for selectively remotely controlling the operation of that one of said condition selective switching means which is associated with the particular device and associated line which are connected to said operator's line, a plurality of remotely positioned subscribers' telephone lines, each having associated dialing equipment, a second device selective switching means responsive to the receipt of dial tones over said subscribers' lines for effective simultaneous connections between various ones of the subscribers' lines and various ones of the device associated telephone lines, and common driving means for continuously driving the magnetic mediums of all of said devices irrespective and independently of the presence of any voltage signal across any of said telephone lines, the operation of either of said control means, and the position of any of said switching means.*

*29. In a telephonic communication system, in combination, an operator's telephone and control set having an operator's transmitter and an operator's receiver and an operator's telephone line associated therewith, said telephone line being connected both to said transmitter and to said receiver, a gang of remotely positioned repeating type magnetic recording-reproducing devices each having an endless movable magnetic medium associated therewith, a gang of telephone lines each connected to an associated one of said recording-reproducing devices, means for connecting said operator's line to a selected one of the lines associated with said devices, said last named means including a device selective switching means, first manually operable control means disposed at said set, and means responsive to actuation of said control means for selectively remotely controlling the position of said device selective switching means, a gang of condition selective switching means, each adapted to selectively control the effective operative connection between an associated one of said devices and its associated telephone line as between a connection wherein a signal previously recorded on the device is reproduced and impressed upon its associated line, on the one hand, and a connection wherein a signal previously recorded on the device is erased and a new signal appearing on the associated line is simultaneously recorded on the device, on the other hand, a second manually operable control means disposed at said set, means responsive to actuation of said second control means for selectively remotely controlling the operation of that one of said condition selective switching means which is associated with the particular device and associated line which are connected to said operator's line, said last named means including a control signal connection through said device selective switching means, a plurality of remotely positioned subscribers' telephone lines, each having associated dialing equipment, and a second device selective switching means for effecting simultaneous connections between various ones of the subscribers' lines and various ones of the device associated telephone lines.*

*30. In a telephonic communication system, in combination, an operator's telephone and control set having an operator's transmitter and an operator's receiver and an operator's telephone line associated therewith, said telephone line being connected both to said transmitter and to said receiver, a gang of remotely positioned repeating type magnetic recording-reproducing devices each having an endless movable magnetic medium associated therewith, a gang of telephone lines each connected to an associated one of said recording-reproducing devices, means for connecting said operator's line to a selected one of the lines associated with said devices, said last named means including a device selective switching means, first manually operable control means disposed at said set, and means responsive to actuation of said control means for selectively remotely controlling the position of said device selective switching means, a gang of condition selective switching means, each adapted to selectively control the effective operative connection between an associated one of said devices and its associated telephone line as between a connection wherein a signal previously recorded on the device is reproduced and impressed upon its associated line, on the one hand, and a connection wherein a signal previously recorded on the device is erased and a new signal appearing on the associated line is simultaneously recorded on the device, on the other hand, a second manually operable control means disposed at said set, means responsive to actuation of said second control means for selectively remotely controlling the operation of that one of said condition selective switching means which is associated with the particular device and associated line which are connected to said operator's line, said last named means including a control signal connection through said device selective switching means, a plurality of remotely positioned subscribers' telephone lines, each having associated dialing equipment, a second device selective switching means responsive to the receipt of dial tones over said subscribers' lines for effecting simultaneous connections between various ones of the subscribers' lines and various ones of the device associated telephone lines, and common driving means for continuously driving the magnetic mediums of all of said devices irrespective and independently of the presence of any voltage signal across any of said telephone lines, the operation of either of said control means, and the position of any of said switching means.*

*31. In a telephonic communication system, in combination, an operator's telephone and control set having an operator's transmitter and an operator's receiver and an operator's telephone line associated therewith, said telephone line being connected both to said transmitter and to said receiver, a gang of remotely positioned repeating type magnetic recording-reproducing devices each having an endless movable magnetic medium associated therewith, timing means for measuring a period of time equal to that required for a complete cycle of said magnetic mediums, a gang of telephone lines each connected to an associated one of said recording-reproducing devices, means for connecting said operator's line to a selected single one only of the lines associated with said devices, said last named means including a device selective switching means, first manually operable control means disposed at said set, and means responsive to actuation of said control means for selectively remotely controlling the position of said device selective switching means, a gang of condition selective switching means, each adapted to selectively control the effective operative connection between an associated one of said devices and its associated telephone line as between a normal connection wherein a signal previously recorded on the device is reproduced and impressed upon its associated line, on the one hand, and a non-normal connection wherein a signal previously recorded on the device is erased and a new signal appearing on the associated line is simultaneously recorded on the device, on the other hand, a second manually operable control means disposed at said set, means responsive to momentary actuation of said second control means for remotely actuating to its non-normal position that one of said condition selective switching means which is associated with the particular device and associated line which are connected to said operator's line, means responsive to said timing means for automatically returning said actuated condition selective switching means to its normal position after the lapse of one complete cycle, a plurality of remotely positioned subscribers' telephone lines, each having associated dialing equipment, a second device selective switching means responsive to the receipt of dial*

*tones over said subscribers' lines for effecting simultaneous connections between various ones of the subscribers' lines and various ones of the device associated telephone lines, and common driving means for continuously driving the magnetic mediums of all of said devices irrespective and independently of the presence of any voltage signal across any of said telephone lines, the operation of either of said control means, and the position of any of said switching means.*

*32. In a telephonic communication system, in combination, an operator's telephone and control set having an operator's transmitter and an operator's receiver and an operator's telephone line associated therewith, said telephone line being connected both to said transmitter and to said receiver, a gang of remotely positioned repeating type magnetic recording-reproducing devices each having an endless movable magnetic medium associated therewith, timing means for measuring aperiod of time equal to that required for said magnetic mediums to make a complete cycle, a gang of telephone lines each connected to an associated on of said recording-reproducing devices, means for connecting said operator's line to a selected single one only of the lines associaed with said devices, said last named means including a device selective switching means, first manually operable control means disposed at said set, and means repsonsive to actuation of said control means for selectively remotely controlling the position of said device selective switching means, a gang of condition selective switching means, each adapted to selectively control the effective operative connection between an associated one of said devices and its associated telephone line as between a normal connection wherein a signal previously recorded on the device is reproduced and impressed upon its associated line, on the one hand, and a non-normal connection wherein a signal previously recorded on the device is erased and a new signal appearing on the associated line is simultaneously recorded on the device, on the other hand, a second manually operable control means disposed at said set, means responsive to momentary actuation of said second control means and to said timing means for transferring to its non-normal position, for one cycle, that one of said condition selective switching means which is associated with the particular device and associated line which are connected to said operator's line, said last-named means including a control signal connection through said device selective switching means, there remaining at least a plurality of the condition selective switching means in their normal reproduce positions, a plurality of remotely positioned subscribers' telephone lines, each having associated dialing equipment, a second device selective switching means responsive to the receipt of dial tones over said subscribers' lines for effecting simultaneous connections between various ones of the said subscribers' lines and various ones of the said devices, common driving means for all of said magnetic mediums, means for continuously energizing said common driving means irrespective and independently of the presence of any voltage signal across any of said telephone lines, the operation of either of said control means, and the position of any of said switching means, and means for providing the operator with a physical indication of the duration of one cycle.*

*33. In a telephonic communication system, in combination, a gang of repeating type magnetic recording-reproducing devices, each having current information on a different item individual to that device recorded thereon, each of said devices having, associated therewith, an endless movable magnetic medium, means for reproducing a signal previously recorded on said medium, means for simultaneously erasing a previously recorded signal and recording a new signal on said medium and condition selective switching means having a normal reproduce position connecting said reproducing means for effective operation and a non-normal erase-record position connecting said erase-record means for effective operation, a remotely positioned operator's telephone and control set having an operator's transmitter and an operator's receiver and an operator's telephone line associated therewith, device selective switching means adapted to connected said operator's line to a selected one of said magnetic recording-reproducing devices first manually operable control means disposed at said set for selectively controlling the operation of said device selective switching means, a second manually operable remote control means disposed at said set for transferring to its non-normal erase-record position that one of said condition selective switching means which is associated with the particular device which is connected to the said operator's telephone line, there remaining at least a plurality of the condition selective switching means in their normal reproduce positions, a plurality of remotely positioned subscribers' telephone lines, and a second device selective switching means for effecting simultaneous connections between various ones of the said subscribers' lines and various ones of the said devices.*

*34. In a telephonic communication system, in combination, a gang of repeating type magnetic recording-reproducing devices, each having current information on a different item individual to that device recorded thereon, each of said devices having, associated therewith, an endless movable magnetic medium, means for reproducing a signal previously recorded on said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, a remotely positioned operator's telephone and control set having an operator's transmitter and an operator's receiver and an operator's telephone line associated therewith, said telephone line being connected both to said transmitter and to said receiver, device selective switching means adapted to connect said operator's line to a selected one of said magnetic recording-reproducing devices in operative reproduce or record relationship therewith depending on the position of the associated condition selective switching means, first manually operable control means disposed at said set for selectively controlling the operation of said device selective switching means, a second manually operable remote control means disposed at said set for transferring to its non-normal erase-record position that one of said condition selective switching means which is associated with the particular device which is connected to the said operator's telephone line, there remaining at least a plurality of the condition selective switching means in their normal reproduce positions, a plurality of remotely positioned subscribers' telephone lines and a second device selective switching means for effecting simultaneous connections between various ones of the said subscribers' lines and various ones of the said devices.*

*35. In a telephonic communication system, in combination, a gang of repeating type magnetic recording-reproducing devices, each having current information on a different item individual to that device recorded thereon, each of said devices having, associated therewith, an endless movable magnetic medium, means for reproducing a signal previously recorded on said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, a remotely positioned operator's telephone and control set having an operator's transmitter and an operator's receiver and an operator's telephone line associated therewith, device selective switching means adapted to connect said operator's line to a selected single one only of said mag-*

*netic recording-reproducing devices, first manually operable control means disposed at said set, means responsive to actuation of said control means for selectively remotely controlling the operation of said device selective switching means, a second manually operable control means disposed at said set, means responsive to actuation of said second control means for transferring to its non-normal erase-record position that one of said condition selective switching means which is associated with the particular device which is connected to the said operator's telephone line, there remaining at least a plurality of the condition selective switching means in their normal reproduce positions, a plurality of remotely positioned subscribers' telephone lines, each having associated dialing equipment, and a second device selective switching means responsive to the receipt of dial tones over said subscribers' lines for effecting simultaneous connections between various ones of the subscribers' lines and various ones of the device associated telephone lines.*

*36. In a telephonic communication system, in combination, a gang of repeating type magnetic recording-reproducing devices, each having current information on a different item individual to that device recorded thereon, each of said devices having, associated therewith, an endless movable magnetic medium, means for reproducing a signal previously recorded on said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, a common drive means for the magnetic mediums of all of said devices, said magnetic mediums having a common period for completion of one cycle, a remotely positioned operator's telephone and control set having an operator's transmitter and an operator's receiver and an operator's telephone line associated therewith, device selective switching means adapted to connect said operator's line to a selected single one only of said magnetic recording reproducing devices, first manually operable control means disposed at said set, means responsive to actuation of said control means for selectively remotely controlling the operation of said device selective switching means, a second manually operable control means disposed at said set, means responsive to actuation of said second control means for transferring to its non-normal erase-record position that one of said condition selective switching means which is associated with the particular device which is connected to the said operator's telephone line, there remaining at least a plurality of the condition selective switching means in their normal reproduce positions, a plurality of remotely positioned subscribers' telephone lines, each having associated dialing equipment, a second device selective switching means responsive to the receipt of dial tones over said subscribers' lines for effecting simultaneous connections between various ones of the subscribers' lines and various ones of the said devices, and means for continuously energizing said common drive means irrespective and independently of the presence of any voltage signal across any of said telephone lines, the operation of either of said control means, and the position of any of said switching means.*

*37. In a telephonic communication system, in combination, a gang of repeating type magnetic recording-reproducing devices, each having current information on a different item individual to that device recorded thereon, each of said devices having, associated therewith, an endless movable magnetic medium, means for reproducing a signal previously recorded on said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, a common drive means for the magnetic mediums of all of said devices, said magnetic mediums having a common period for completion of one cycle, timing means for measuring a period of time equal to said cycle time, a remotely positioned operator's telephone and control set having an operator's transmitter and an operator's receiver and an operator's telephone line associated therewith, device selective switching means adapted to connect said operator's line to a selected one of said magnetic recording-reproducing devices, first manually operable control means disposed at said set, means responsive to actuation of said control means for selectively remotely controlling the operation of said device selective switching means, a second manually operable control means disposed at said set, means responsive to momentary actuation of said second control means and to said timing means for transferring to its non-normal erase-record position, for one cycle, that one of said condition selective switching means which is associated with the particular device which is connected to said operator's telephone line, said last-named means including a control signal connection through said device selective switching means, there remaining at least a plurality of the condition selective switching means in their normal reproduce positions, a plurality of remotely positioned subscribers' telephone lines, each having associated dialing equipment, a second device selective switching means responsive to the receipt of dial tones over said subscribers' lines for effecting simultaneous connections between various ones of the said subscribers' lines and various ones of the said devices, means for continuously energizing said common driving means irrespective and independently of the presence of any voltage signal across any of said telephone lines, the operation of either of said control means, and the position of any of said switching means, and means for providing the operator with a physical indication of the duration of one cycle.*

*38. In a telephonic communication system, in combination, a gang of repeating type magnetic recording-reproducing devices, each having current information on a different item individual to that device recorded thereon, each of said devices having, associated therewith, an endless movable magnetic medium, means for reproducing a signal previously recorded on said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, a common drive means for the magnetic mediums of all of said devices, said magnetic mediums having a common period for completion of one cycle, timing means for measuring a period of time equal to said cycle time, a remotely positioned operator's telephone and control set having an operator's transmitter and an operator's receiver and an operator's telephone line associated therewith, said telephone line being connected both to said transmitter and to said receiver, device selective switching means adapted to connect said operator's line to a selected single one only of said magnetic recording-reproducing devices in operative reproduce or record relationship therewith depending on the position of the associated condition selective switching means, first manually operable control means disposed at said set, means responsive to actuation of said control means for selectively remotely controlling the operation of said device selective switching means, a second manually operable control means disposed at said set, means responsive to momentary actuation of said second control means and to said timing means for transferring to its non-normal erase-record position, for one cycle, that one of said condition selective switching means which is associated with the particular device which is connected to the said operator's telephone line, said last-named means includ-*

*ing a control signal connection through said device selective switching means, there remaining at least a plurality of the condition selective switching means in their normal reproduce positions, a plurality of remotely positioned subscribers' telephone lines, each having associated dialing equipment, a second device selective switching means responsive to the receipt of dial tones over said subscribers' lines for effecting simultaneous connections between various ones of the said subscribers' lines and various ones of the said devices, means for continuously energizing said common driving means irrespective and independently of the presence of any voltage signal across any of said telephone lines, the operation of either of said control means, and the position of any of said switching means, and means for providing the operator with a physical indication of the duration of one cycle.*

*39. In a telephonic communication system, in combination, an operator's telephone and control set having an operator's transmitter and an operator's receiver and an operator's telephone line associated therewith, said telephone line being connected both to said transmitter and to said receiver, a repeating type magnetic recorder having a recording head, a transmitting head, an erasing head, and an endless movable magnetic medium operatively associated with said heads, said recording head and said erasing head being connected to operate simultaneously, circuit means for coupling the input of said recording head and the output of said transmitting head to said telephone line, said circuit means including switching means operable to simultaneously uncouple the output of said transmitting head from said telephone line and energize said erasing head, timing means for automatically restoring said switching means to its original position after the lapse of a period of time after operation of said switching means equal to the time required for said magnetic medium to complete one cycle, means for continuously driving said magnetic medium irrespective and independently of the presence of any voltage signal across said telephone line, and means for providing the operator with a physical indication of the time required for said magnetic medium to complete one cycle.*

*40. In a telephonic communication system, in combination, an operator's telephone and control set having an operator's transmitter and an operator's receiver and an operator's telephone line associated therewith, said telephone line being connected both to said transmitter and to said receiver, a repeating type magnetic recorder having a recording head, a transmitting head, an erasing head, and an endless movable magnetic medium operatively associated with said heads, a source of erasing potential for said erasing head, circuit means for operatively connecting said magnetic recorder to said line, said circuit means including a two position switch having a switching element associated with each of said heads, the normal position of said switch being such as to make a connection between the transmitting head and said line and to break connections between the recording head and said line and between the erasing head and said potential source, and the non-normal position of said switch being such as to make connections between the recording head and said line and between the erasing head and said potential source and to break a connection between the transmitting head and said line, timing means for automatically restoring said switch to its normal position after the lapse of a period of time, after actuation of said switch to its non-normal position, equal to the time required for said magnetic medium to complete one cycle, and means for continuously driving said magnetic medium irrespective and independently of the presence of any voltage signal across said telephone line.*

*41. In a telephonic communication system, in combination, a gang of repeating type magnetic recording-reproducing devices, each of said devices having, associated therewith, an endless movable magnetic medium, means for reproducing a signal previously recorded on said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, each of said magnetic mediums having magnetically recorded thereon current information on a group of items individual to the associated recorder, separate portions along the length of each of said magnetic mediums having magnetically recorded thereon current information on an item individual to the associated portion, a gang of telephone lines each connected to an associated one of said recording-reproducing devices, an operator's control set, an operator's line extending to said operator's set, remote control means, controllable from the operator's set, for connecting said operator's line to a selected one of the lines associated with said devices and for remotely transferring the condition selective switching means associated with the selected line to its non-normal erase-record position for a period of time substantially equal to that required for the magnetic medium to move a distance equal to one of said portions, and means for continuously driving the magnetic mediums of all of said devices irrespective and independently of the presence of any voltage signal across any of said lines.*

*42. In a telephonic communication system, in combination, a gang of repeating type magnetic recording-reproducing devices, each of said devices having, associated therewith, an endless movable magnetic medium, means for reproducing a signal previously recorded on said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, each of said magnetic mediums having magnetically recorded thereon current information on a group of items individual to the associated recorder, separate equal portions along the length of each of said magnetic mediums having magnetically recorded thereon current information on an item individual to the associated portion, means for timing a period of time substantially equal to that required for the magnetic medium to move a distance equal to one of said portions, a gang of telephone lines each connected to an associated one of said recording-reproducing devices, a remotely positioned operator's telephone set, an operator's line extending to said operator's set, means for connecting said operator's line to a selected one of the lines associated with said devices, manually operable remote control means disposed at said set, means responsive to said control means and to said timing means for remotely transferring that one of said condition selective switching means which is associated with the particular device and associated line which are connected to said operator's line to it's non-normal erase-record position for a period of time equal to said timed period, said last named means including means responsive to the appearance of a control signal across said line, means for impressing on said operator's line voice currents representative of revised current information as to a single item during said timed period, a plurality of remotely positioned subscribers' telephone sets each having an associated telephone line and associated dialing equipment, and means responsive to the receipt of dial tones over said subscribers' lines for connecting said subscribers' lines to selected ones of the device associated telephone lines.*

*43. In a telephonic communication system, in combination, a gang of repeating type magnetic recording-reproducing devices, each of said devices having, associated therewith, an endless movable magnetic medium, means for reproducing a signal previously recorded on*

*said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, each of said magnetic mediums having magnetically recorded thereon current information on a group of items individual to the associated recorder, separate equal portions along the length of each of said magnetic mediums having magnetically recorded thereon current information on an item individual to the associated portion, means for timing a period of time substantially equal to that required for the magnetic medium to move a distance equal to one of said portions, a gang of telephone lines each connected to an associated one of said recording-reproducing devices, an operator's control set, an operator's line extending to said operator's set, means for connecting said operator's line to a selected one of the lines associated with said devices, said last named means including a device selective switching means, manually operable dialing means disposed at said set, and means responsive to actuation of said dialing means for selectively remotely controlling the position of said device selective switching means, a second manually operable control means at said set, means responsive to momentary operation of said second control means and to said timing means for automatically temporarily transferring that one condition selective switching means associated with the device connected to the operator's line to its non-normal erase-record position for the duration of one timed period, means for impressing on said operator's line voice currents representative of revised current information as to a single item during said one timed period, and means for continuously driving the magnetic mediums of all of said devices irrespective and independently of the presence of any voltage signal across any of said telephone lines.*

*44. In a telephonic communication system, in combination, a gang of repeating type magnetic recording-reproducing devices, each of said devices having, associated therewith, an endless movable magnetic medium, means for reproducing a signal previously recorded on said medium, means for simultaneously erasing a previously recorded signal and recording a new signal on said medium, and condition selective switching means having a normal reproduce position connecting said reproducing means for effective operation and a non-normal erase-record position connecting said erase-record means for effective operation, each of said magnetic mediums having magnetically recorded thereon current information on a group of items individual to the associated recorder, separate equal portions along the length of each of said magnetic mediums having magnetically recorded thereon current information on an item individual to the associated portion, means for timing a period of time substantially equal to that required for the magnetic medium to move a distance equal to one of said portions, a gang of telephone lines each connected to an associated one of said recording-reproducing devices, a remotely positioned operator's control set, an operator's line extending to said operator's set, means for connecting said operator's line to a selected one of the lines associated with said devices, said last named means including a device selective switching means, manually operable dialing means disposed at said set, and means responsive to actuation of said dialing means for selectively remotely controlling the position of said device selective switching means, a second manually operable control means disposed at said set, means responsive to said second control means for remotely controlling the operation of that one of said condition selective switching means which is associated with the particular device and associated line which are connected to said operator's line, said last named means including means responsive to the appearance of an alternating control signal not in the normal voice range on said operator's line for simultaneously transferring said one condition selective switching means to its non-normal erase-record position and for initiating operation of said timing means, and means responsive to said timing means for automatically restoring said condition selective switching means to its normal position after said timed period of time, means for impressing on said operator's line voice currents representative of revised current information as to a single item during said timed period of time, a plurality of remotely positioned listeners' telephone lines, each having associated dialing equipment, a second device selective switching means responsive to the receipt of dial tones over said listeners' lines for effecting simultaneous connections between various ones of the listeners' lines and various ones of the device associated telephone lines, and common driving means for continuously driving the magnetic mediums of all of said devices irrespective and independently of the presence of any voltage signal aross any of said lines, the operation of any of said control or dialing means, and the position of any of said switching means.*

References Cited in the file of this patent or the original patent

UNITED STATES PATENTS

| | | |
|---|---|---|
| Re. 23,054 | Dealsin | Dec. 7, 1948 |
| 2,006,455 | Hickman | July 2, 1935 |
| 2,060,545 | Abbott | Nov. 10, 1936 |
| 2,092,493 | Allen et al. | Sept. 7, 1937 |
| 2,221,883 | Rowe | Nov. 19, 1940 |
| 2,224,244 | Hicks | Dec. 10, 1940 |
| 2,350,083 | Walker | May 30, 1944 |
| 2,351,009 | Camras | June 13, 1944 |
| 2,429,792 | Begun | Oct. 28, 1947 |
| 2,526,358 | Howell | Oct. 17, 1950 |

FOREIGN PATENTS

| | | |
|---|---|---|
| 691,711 | France | Oct. 24, 1930 |